Figure 1:
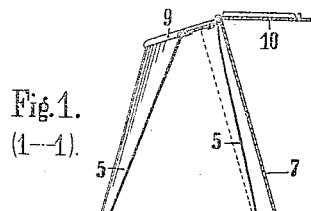

E. BRAUBURGER.
FOLDABLE REFLEX CAMERA.
APPLICATION FILED AUG. 28, 1908.

913,353.

Patented Feb. 23, 1909.

(1—1).

UNITED STATES PATENT OFFICE.

ERNST BRAUBURGER, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, GERMANY.

FOLDABLE REFLEX-CAMERA.

No. 913,353.  Specification of Letters Patent.  Patented Feb. 23, 1909.

Application filed August 23, 1908. Serial No. 450,786.

*To all whom it may concern:*

Be it known that I, ERNST BRAUBURGER, a citizen of the German Empire, and resident of Friedenau, near Berlin, Germany, engineer, have invented certain new and useful Improvements in Foldable Reflex-Cameras, of which the following is a specification.

This invention relates to a foldable reflex camera in which the mirror and frosted plate are hinged to the back frame of the camera.

In known reflex cameras which can be folded in the manner of books the objective board is directly hinged to a camera-wall of which the end opposite the hinge-point of the objective board is rotatably connected to the back frame. This method of connecting the objective board to the back frame necessitates a particular length of the camera-wall which carries the objective board, and dependent thereon a particular distance of the objective from the image plane when the camera is in position for use. Since the size of the mirror or frosted plate to be used depends on the size of the image-aperture it is not possible, in the case of the known foldable reflex cameras, to select the distance of the objective board from the image plane independently of the size of the image aperture, viz: to so select it that the focal length of the objective is conveniently proportioned relatively to the size of the image-aperture. It is found that in the case of the known reflex cameras foldable in the manner of books objectives of undesirably large focal length must be selected owing to the fact that the camera-wall carrying the objective board must be of comparatively great length in view of the length of mirror required for a certain size of image-aperture.

According to the present invention independence of the objective focal length from the size of the image-aperture is secured by not hinging the objective board directly to the frosted plate carrier but hinging same by means of an intermediate piece which renders it possible, when folding the camera, to displace the objective frame from the hinge point of the frosted plate carrier, and to move it toward the said hinge point, or towards the back frame of the camera, when moving the parts into working position. In conjunction with this arrangement of the objective board is an arrangement of the frosted plate in its carrier in such manner that in the working position of the camera it is farther from the optical axis than the point of rotation of the mirror. This will be made clear in the following description, reference being made to the annexed drawing.

The displacement of the frosted plate from the optical axis beyond the point of rotation of the mirror preferably takes place in such manner that the frosted plate forms the cover of a bottomless box hinged to the back frame, with its bottom aperture closed and made light-proof by the mirror. In this manner a simple element of the construction prevents access of light through the frosted plate to the interior of the camera while the camera is in operative position.

The invention is illustrated by means of an example of construction in the annexed drawing.

Figure 2:
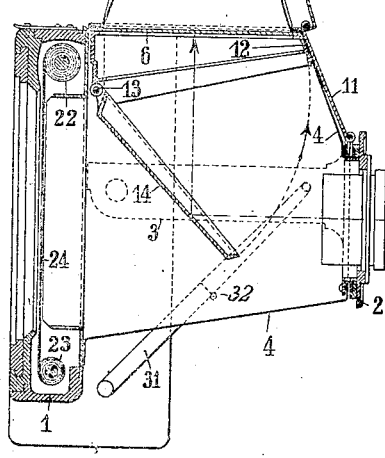
Figure 4:
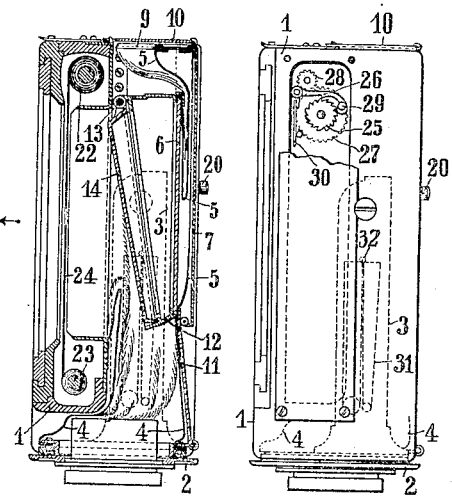
Figure 3:
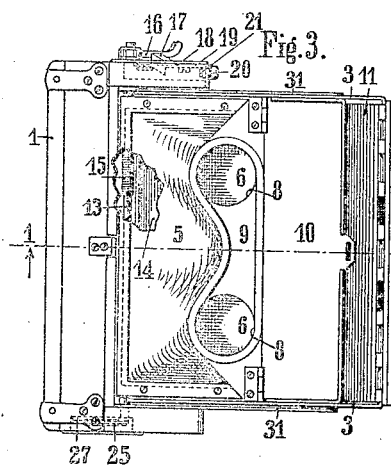
Figure 5:
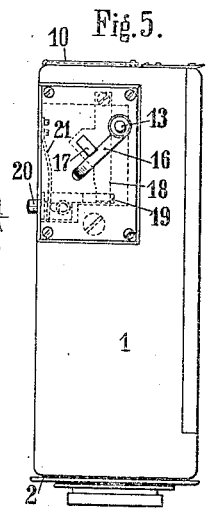
Figure 6:
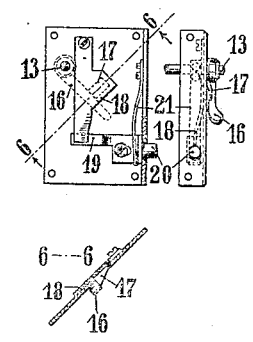

Figure 1 is a longitudinal section of the camera in working position. Fig. 2 is a similar section of the camera in the position of rest or folded. Fig. 3 is a top plan of the camera in working position. Fig. 4 is a side view of the folded camera with part of the casing-wall broken away. Fig. 5 shows the camera from the side opposite to that seen in Fig. 4. Fig. 6 shows the releasing mechanism of the camera by means of two views perpendicular to each other and in section on the line 6—6.

In the drawing the camera casing for reception of the plate end closure is marked 1. The objective board has the denomination 2 and is hinged to the camera casing by lateral foldable struts 3. The light-proof connection of the objective board to the camera casing is made by a bellows 4.

5 is an adjusting bellows erectable over the frosted plate 6 and stiffened by a cover plate 7 and cover plate 9, the latter having view-holes 8. On the cover plate 9 is a closing flap 10.

The objective board 2 is pivotally connected to the back frame by a wall plate 11 and frosted plate carrier 12 with hinge axle 13, as well as by the struts 3. The adjusting mirror rotatable about the hinge axis 13 of the frosted plate carrier is marked 14. A helical spring 15 tends to move the mirror into its position of rest in which it abuts against the lower aperture of the frosted plate carrier, which forms a box-like casing open at the bottom, as shown in Fig. 2. On the axle of the adjusting mirror 14 there is an arm 16 serving as an abutment adapted to co-act with a locking projection 17. The locking projection 17 is mounted on a resilient metal piece 18 which is fastened to the casing and can be so bent from the casing wall by a bolt 19 having an inclined plane and press button 20, that the projection 17 releases the arm 16. A spring 21 tends to hold the bolt 19 permanently in its position of rest, which is illustrated in the figures of the drawing.

22 and 23 indicate the winding rollers of a curtain shutter 24, which can be held in the wound up position by a pawl 26 engaging a ratchet wheel 25. The connection of the ratchet wheel 25 to the winding roller of the curtain (in the construction shown in Figs. 1 and 2 the upper winding roller) is made by toothed wheels 27, 28 of which the latter is supposed to be mounted on the axle of winding roller 22.

29 indicates an eccentric mounted on the axle of the adjusting mirror 14 and adapted to co-act with the pawl 26.

30 is a spring which tends to hold the pawl 26 in permanent engagement with the ratchet wheel 25.

31 indicates two lateral bi-partite rods, with joint marked at 32, connecting the camera casing to the arms 3.

The manner of using the camera, and its action, are as follows: Let it be assumed the camera is in the working position shown in Figs. 1 and 3. In this case the image projected by the objective mounted in the objective board is reflexed by the mirror 14 on to the frosted plate 6 and can be seen thereon through the view holes 8, so that the adjustment of the objective to the respective focus can be effected in the known manner.
If after the adjustment a picture is to be taken the adjusting mirror is released by pressure on the button 20, and the slide 19 pushes back the resilient plate 18 carrying the projection 17 so that the arm 16 can move past the projection. As soon as the arm 16 is released the mirror 14 is rotated upwards by the action of the spring 15 so that it enters from below the box-like frosted plate carrier 12, and makes a light-proof closure of the interior of the camera. Together with the upward movement of the mirror 14 there takes place a rotation of the eccentric 29 on the mirror axle, so that at the moment at which the mirror reaches its upper position the release of the pawl 26 from the teeth of the ratchet wheel 25 is effected. A spring-pull acting in the known manner on the curtain 24 then causes the shutter to act, since the toothed wheels 27, 28 no longer prevent rotation of the curtain roller 22, the pawl 26 being disengaged. By winding up the curtain again any desired number of pictures can be taken in the manner described.

When the camera is to be folded the rods 31 are bent and the arms 3 connecting the objective board 2 with the camera casing are thus no longer prevented from rotating and are rotated downwards into the position shown in Fig. 2; the halves of the rods 31, connected by the joint 32, are thus folded together, and the objective board is laid against the under side of the camera casing as shown in Figs. 2, 4 and 5. During this folding of the arms 31 the under part of the bellows 4 is folded as shown in Fig. 2. Together with the folding of the arms 3 with the objective board 2 there takes place a folding of the box-like frosted plate carrier 12 and of the camera wall 11 connecting the same with the objective board, these parts being moved into the position shown in Fig. 2. The bellows parts 4 and 5 are laid together in the manner shown in Fig. 2, and the cover 7 and folded cover 10 secure the parts from outside, so that the camera parts substantially appear as inclosed in a simple casing. By repeating the operations in the reversed order the camera can be brought back to its working condition.

Having now partially described and ascertained the nature of my said invention and in what manner the same is to be performed, I declare that what I claim is:

1. In a foldable reflex camera a back frame, a pivotally mounted reflector, a frosted plate, a carrier for same, pivotally connected to said back frame, an objective carrier, a rigid intermediate member between said objective carrier and frosted plate carrier pivoted both to the frosted plate carrier and to the objective carrier and adapted to form a part of the camera casing when the camera is closed and a light-tight foldable structure connected to said back frame, objective and frosted plate carrier and intermediate member and adapted to form a camera box.

2. In a foldable reflex camera a back frame, a pivotally mounted reflector, a frosted plate mounted at a distance from the pivot of said reflector, a carrier for said frosted plate pivotally connected to said back frame, an objective carrier, a rigid intermediate member between said objective carrier and frosted plate carrier pivoted both to the frosted plate carrier and to the objective carrier and adapted to form a part of the camera casing when the camera is closed and a light-tight foldable structure connected to said back frame, objective and frosted plate carrier and intermediate member and adapted to form a camera box.

3. In a foldable reflex camera a back frame, a pivotally mounted reflector, a frosted plate, a carrier for same in the form of a bottomless box hinged to the back frame with the frosted plate as a cover, the reflector arranged in a manner adapted to light-tightly close the bottom opening of said box, an objective carrier, an intermediate member between same and said bottomless box pivoted both to the objective carrier and to the bottomless box carrier of the frosted plate and a light-tight foldable structure connected to said back frame, objective and frosted plate carrier and intermediate member and adapted to form a camera box.

4. In a foldable reflex camera a back frame, a pivotally mounted reflector, a frosted plate, a carrier for same in the form of a bottomless box hinged to the back frame with the frosted plate as a cover, the reflector having its turning axis coinciding with the turning axis of the bottomless box and arranged in a manner adapted to light-tightly close the bottom opening of said box, an objective carrier, an intermediate member between same and said bottomless box pivoted both to the objective carrier and to the bottomless box carrier of the frosted plate and a light-tight foldable structure connected to said back frame, objective and frosted plate carrier and intermediate member and adapted to form a camera box.

5. In a foldable reflex camera a back frame, a pivotally mounted reflector, a frosted plate, a carrier for same pivotally connected to said back frame, an objective carrier, a foldable strut connection between said objective carrier and back frame, a rigid intermediate member between said objective carrier and frosted plate carrier pivoted both to the objective carrier and to the frosted plate carrier and adapted to form a part of the camera casing when the camera is closed and a light-tight foldable structure connected to said back frame, objective and frosted plate carrier and intermediate member and adapted to form a camera box.

In testimony whereof I have signed this specification in the presence of two subscribing witnesses.

ERNST BRAUBURGER.

Witnesses:
  WOLDEMAR HAUPT,
  ARTHUR SCHROEDER.